United States Patent [19]
Livneh

[11] Patent Number: 4,736,812
[45] Date of Patent: Apr. 12, 1988

[54] REMOTE SWITCHING MECHANISM

[76] Inventor: Zvi Livneh, 3290 Avondale Ave., Windsor, Ontario, Canada, N9E 1X6

[21] Appl. No.: 935,213

[22] Filed: Nov. 26, 1986

[51] Int. Cl.⁴ .............................................. B60T 7/16
[52] U.S. Cl. .................................... 180/168; 180/167
[58] Field of Search ...................... 180/168, 167, 79.1; 104/88; 318/587

[56] References Cited

U.S. PATENT DOCUMENTS

| | | | |
|---|---|---|---|
| 3,245,493 | 4/1966 | Barrett, Jr. ..................... | 180/168 X |
| 4,322,670 | 3/1982 | Taylor ................................ | 180/168 |
| 4,500,970 | 2/1985 | Daemmer ........................... | 180/168 |
| 4,630,216 | 12/1986 | Tyler et al. ...................... | 180/168 X |

FOREIGN PATENT DOCUMENTS 1196711 11/1985 Canada ............................... 180/168

Primary Examiner—James T. McCall
Attorney, Agent, or Firm—Mitches & Co.

[57] ABSTRACT

Where automated travel of the vehicle is desired, and there are a number of branches, for directing the vehicle along a variety of different paths, it is be convenient for the vehicle to include a specific sensor means for sensing precoded control instructions placed contigious to the path, whereby to determine which branch path is to be selected by the vehicle as it travels among the main or any of a plurality of branch paths thereof so as to accomplish its task.

10 Claims, 5 Drawing Sheets

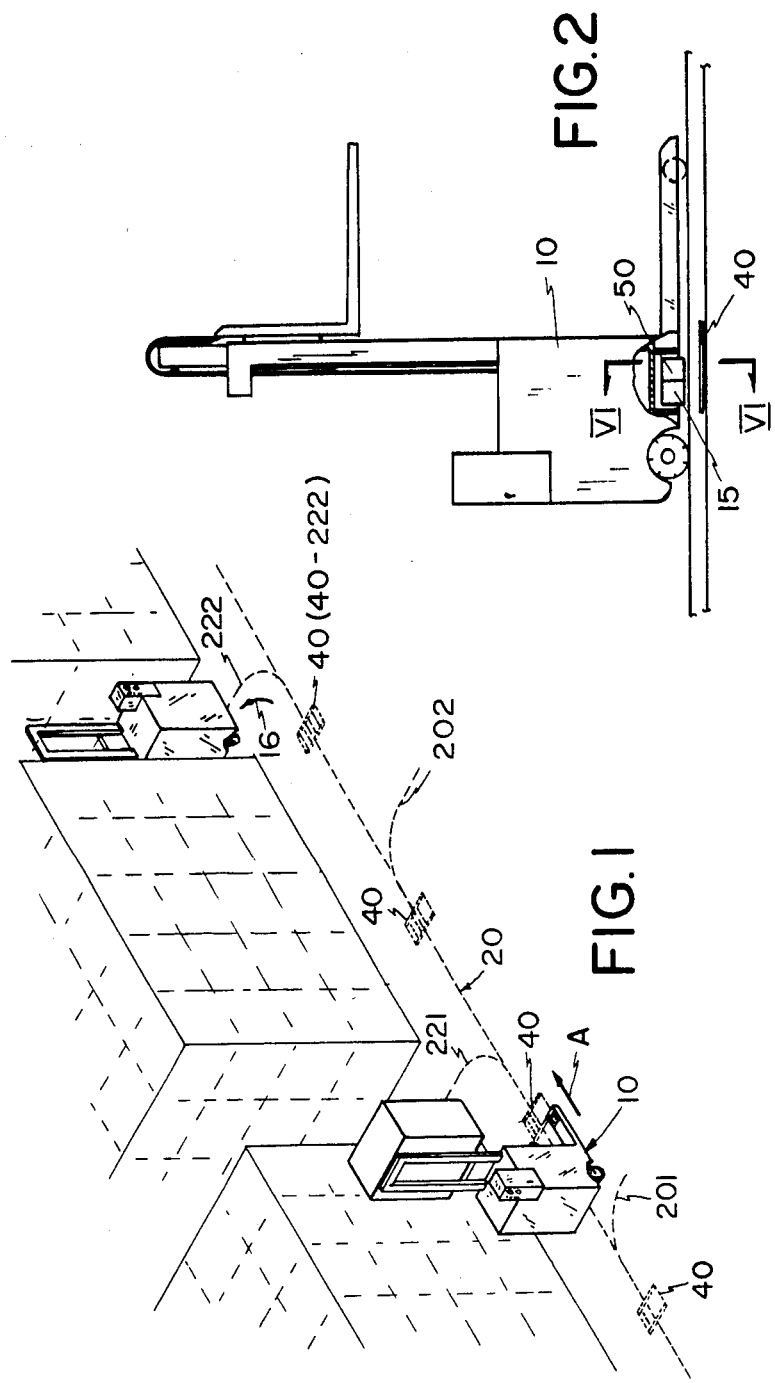

REMOTE SWITCHING MECHANISM

This invention relates to a remote switching mechanism and particularly to a indicator and sensor therefor for determining unique switching codes, whereby switching may take place automatically.

In my Canadian Pat. No. 1,196,711, issued Nov. 12, 1985, entitled TERRAIN POSITIONED TRACKING MEANS AND GUIDANCE SENSOR THEREFOR, I have disclosed a guidance system for directing a vehicle along a predetermined path of travel. Such system employs a filament as a means for defining the track or proposed path of travel for the vehicle, and a sensor on the vehicle for sensing the track and appropriate mechanisms associated with the sensor for directing the travelling path of the vehicle along the predetermined proposed path or track.

The aforesaid disclosure finds principal application where the path is one continuous path without any significant branches or interbranches.

Where automated travel of the vehicle is desired, and there are a number of branches, for directing the vehicle along a variety of different paths, it would be convenient for the vehicle to include a specific sensor means for sensing precoded control instructions placed contiguous to the path, whereby to determine which branch path is to be selected by the vehicle as it travels among the main or any of a plurality of branch paths thereof so as to accomplish its task.

The invention therefore contemplates an actuating control module mounted adjacent to a filament defining a diverging path of travel for a moving vehicle, the module comprising:

(a) a plurality of predetermined spacially disposed actuating members.

The actuating members may be metallic; or preferably, magnetic.

The invention also contemplates a system for controlling the travelling path of a moving vehicle, having a means for steering, into a selected one of a plurality of predetermined diverging paths, said system including:

(a) a control module as aforesaid mounted near a diverging path;

(b) a first metallic sensing means, carried by the vehicle, that is magnetically responsive to the location of the filament;

(c) a second metallic sensing means carried by said vehicle that is magnetically responsive to a module;

(d) a first position sensing means affixed to the first metallic sensing means, for sensing relative lateral positioning of said first metallic means;

(e) a second position sensing means responsive to said second metallic means, and, (f) first means responsive to said first and second position sensing means for moving said means for steering whereby to direct the travelling path of the vehicle along the path or course of the filament, and for steering the vehicle into and thence along one of said diverging paths when said second metallic and position sensing means are activated. Preferably the metallic means are magnetic.

The invention will now be described by way of example and reference to the accompanying drawings in which.

FIG. 1 is a perspective view of an embodiment of the invention.

FIG. 2 is an elevational view of the travelling vehicle, and an elevational section of the track and control (switching) means.

Figure 10:
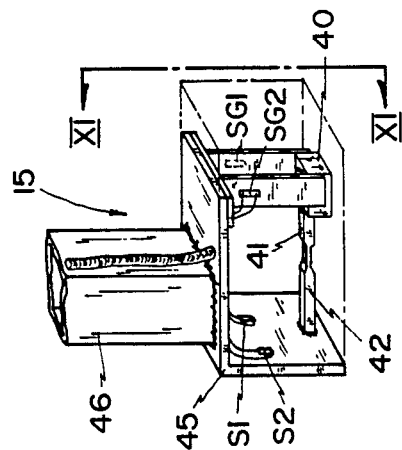
FIG. 10 is a perspective of one embodiment of a filament sensing device used to follow the filament path of travel.
Figure 11:
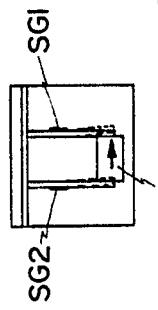
Figure 11A:

FIGS. 11, 11A respectively are explanatory sections along line XI—XI of FIG. 10.

Figure 12:
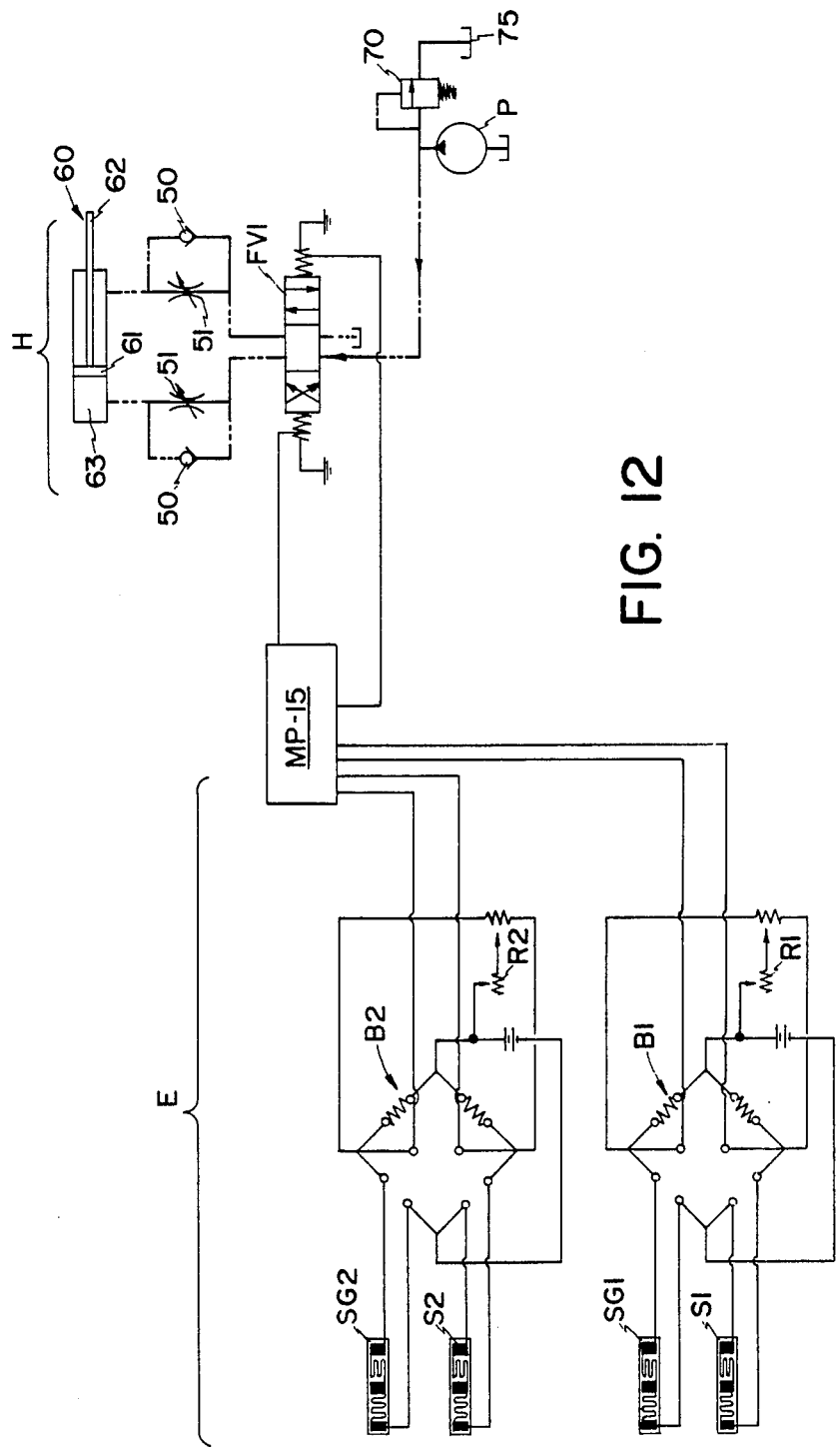

FIG. 12 is an electronic and hydraulic circuit diagram showing means to control the path of travel.

Referring to FIG. 1, a vehicle 10, in the form of a fork-lift truck, is shown travelling in the direction of arrow A along a main path 20. The path 20 has a plurality of branch or satelite paths 201, 202, 221 and 222.

The track 20 is predetermined in the manner described by my aforesaid co-pending application and basically is a metallic filament, such as a wire, or the like, or alternatively a magnetically composed filament. The filament may be placed on the surface with a suitable adhesive, or it may be buried into the surface so as to be protected from wear and scraping.

At stategically located positions along the main and branch paths 20 are placed control modules as frames 40, which themselves can be, as well, disposed on the surface, or into the surface as desired. In the drawings, both the track defining filament 20 and the control frames 40 are shown embedded into the surface.

When the vehicle 10 travels over a control frame 40, as in FIG. 2, a branch sensor 50 carried beneath the vehicle 10 senses the code or signal of the branch switching or control frame 40 and depending on how the sensor 50 is itself encoded, the vehicle will turn at the appropriate next branch, e.g., branch 222 of FIG. 1. In this particular example, and referring to FIG. 1, the control branch sensor 50 of vehicle 10 has been precoded to sense that control frame 40 in advance of branch 222, (e.g. control frame 40-222) and, thus will cause the vehicle 10 to turn, arrow 16, into branch 222, whereby the load of vehicle 10 may be stacked in the warehouse. Thus, by encoding each control frame 20 with different codes, preferably unique codes, the vehicle 10 can be variably programmed or instructed to travel into and out of any filament branch as may be required.

Figure 3:
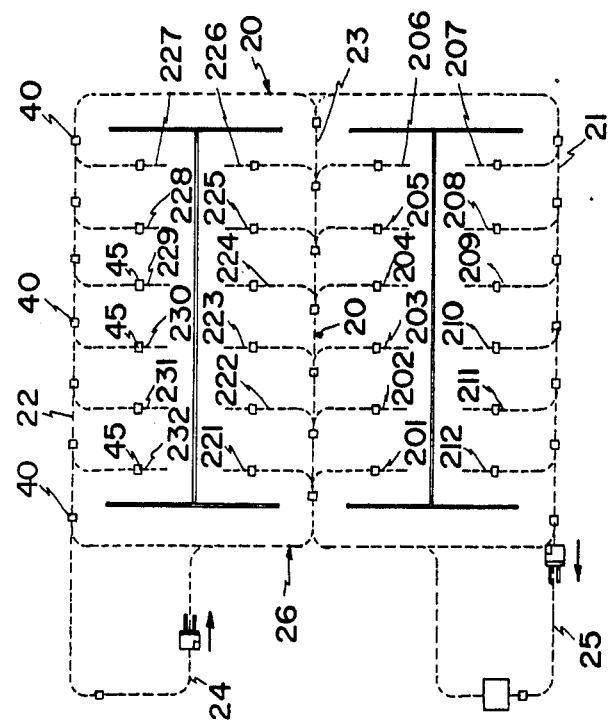
FIG. 3 is a plan view of a typical track indicating a plurality of branches each having precoded control modules or frames in proximity to branch intersections.

Thus, referring to FIG. 3, and a factory floor control path layout, the same is shown with path 20 including a plurality of branch paths 201 through 212; 221 through 232; left and right hand loops 21 and 22, merging along a common axis 23, and branching respectively to loading and unloading loops 24 and 25. At various locations, there are positioned turn control modules preferably in the form of control frames 40, and stop and reverse control frames 45.

Figure 4:
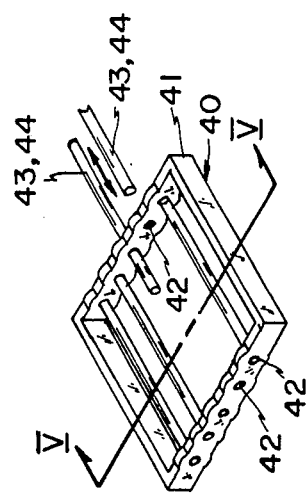
FIG. 4 is a perspective view of a typical control module or frame.
Figure 5:
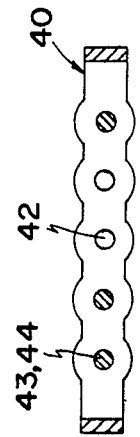
FIG. 5 is a sectional view along line V—V of FIG. 4.

Referring to FIGS. 4 and 5, the control frame 40 has a rigid surround 41 with oppositely disposed apertures 42 through which slide active rods 43 or inactive rods 44. There are 5 rods for the frame 40 shown, although any number of such rods might be used. In the particular embodiment indicated, "actuating" rods 43 may be composed of metallic, ferrous or magnetic material, while "non-actuating" rods 44 of non-metallic or non-magnetic material. Hence, the permutations and combinations of actuating and non-actuating rods allow the frame, when there are five such element holding slots, to possess 25 unique signals. By expanding the length of the frame so that there may be more than 5 rod elements, the frame 40 can be constructed so that at each branch 201 through 212, and 221 through 232, the same can be uniquely identified.

Figure 8:
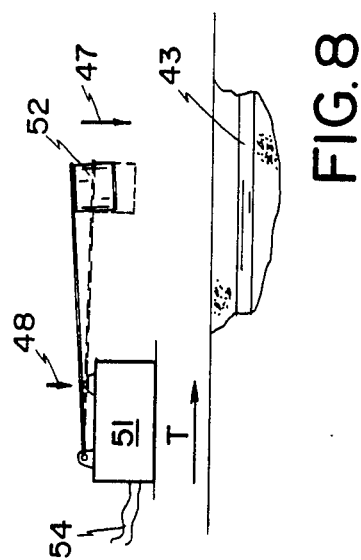
FIG. 8 is an elevational view, partially in section, showing the response of an operative element of the sensing device of FIGS. 6 and 7.
Figure 7:
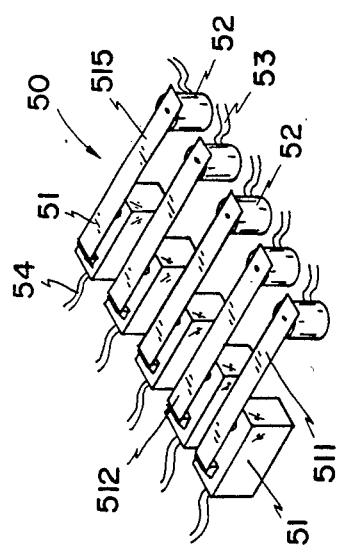
FIG. 7 is an elevational view of the module sensor device on the said vehicle.
Figure 6:
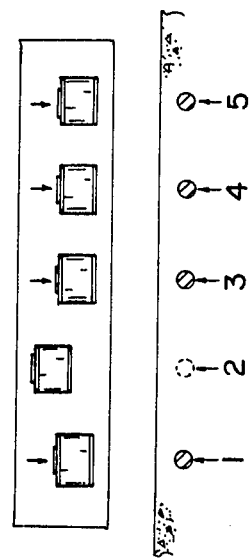
FIG. 6 is a section in elevation through line VI—VI of FIG. 2.

Referring to FIGS. 6, 7 and 8, the switch sensor 50 has a plurality of micro-switches 51 addressed in a bank, each suspending at their distal end, a magnet 52, which, if it is an electromagnet, has an energizing wire 53 attached thereto to energize the electromagnet. From each micro-switch 51 extend wires 54 for suitable connection to a branch switching micro-processing unit MP-50 which is part of the switch sensor control mechanism of FIG. 9.

Referring to FIG. 8, the direction of travel of the vehicle is in the direction of arrow T, while in FIG. 6, the direction of travel of the vehicle is out of the plane of the paper. When, as in FIG. 8, the micro-switches 51 are in registry over the appropriate locations of an actuating rod 43 the magnet 52 thereof "senses" the actuating rod as the vehicle 10 travels. The electromagnet 52 will be attracted toward the rod 43 as per arrow 47 and the actual micro-switch switch of micro-switch 51 is depressed as at arrow 48 whereby the circuit 54 for that micro-switch is closed and that "information" or code is dispatched to the micro-processor, MP-50.

Referring to FIG. 6, as the vehicle 10 travels, first, third, fourth and fifth micro-switches 51 descend whereby to "make" contact; the non-active rod element in position 2 is shown in phantom since it is not active and micro-switch 512 does not close. As an alternative, rod 43 might not be there at all, or be composed of non-metallic, non-ferrous or non-magnetic materials. In any event micro-switch 512 does not "make" contact while micro-switches 511, 513, 514 and 515 do "make" contact.

Figure 9:
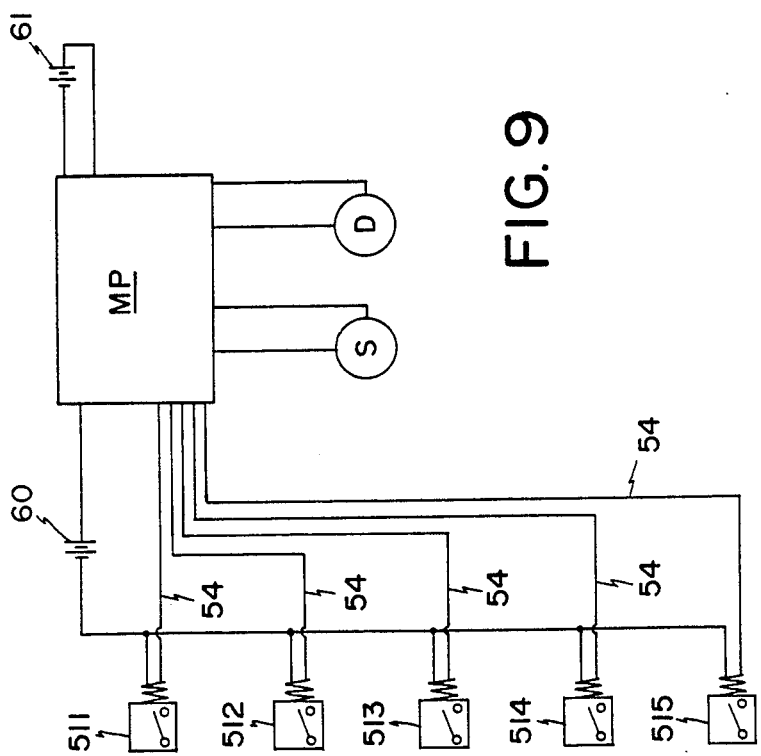
FIG. 9 is an electrical schematic diagram of the control circuitry of the module sensor device.

Referring to FIG. 9 and the branch switching sensor control circuit, the micro-switches are shown in a bank as micro-switches 511 through 515, each respectively connecting via their unique connection wires 54 into a circuit with a common battery 60 and to the branch switching micro-processor MP-50. The micro-processor MP-50 itself is powered by a battery source 61 and when the appropriate switch module or frame encoding, is "sensed" by the micro-switch sensors 51, and is "matched" with that code in the micro-processor MP-50, a control pulse goes to control either the speed of the vehicle through an electro-mechanical device S, or the direction of the vehicle through electro-mechanical device D, or both. The vehicle will thus slow down or turn as per arrow 16 into the appropriate branch 222 while following the underlying filament 20.

Now stop frames 45 may be identical in structure to those of FIG. 4, save and except for the sequence of rods 43 and 44 therein. They then signal to the microprocessor MP-50 to stop and to turn the vehicle around.

For completeness, it would appear appropriate to describe now one of the means for following the track 20 as is described in my aforesaid co-pending application, although it should be appreciated that other means of sensing the filament position can be used as is more particularly disclosed in said Canadian Pat. No. 1,196,711.

Referring to FIGS. 1 and 10 together, adjacent to switch module or frame sensor 50 is a filament tracking sensor 15. The magnetic filament or ferric or metallic track 20, may be composed of a metallic ribbon or magnetic ribbon and acts as a predetermined path of travel for the fork-lift truck 10 and, hence is a sensor control line 20 as will now be better explained.

Referring to FIG. 10, the sensor 15 consists of an electromagnet generally indicated as 18 whose attraction to the ferric ribbon or metallic ribbon or ferromagnetic control line 20 is sensed by two strain gauges SG1 and SG2, although three are shown in FIG. 10 (since this figure is identical to FIG. 2 of my aforesaid co-pending application). (The reasons for strain gauge SG3 and strain gauge S3 are not relevant to this disclosure and for interest, the disclosure contained in the aforesaid copending application can be addressed.) Each of the strain gauges SG1 and SG2 is connected to one of its own branches of its own Wheatstone bridge B forming part of the electronic circuitry E of FIG. 12.

Referring to FIG. 12, there are two Wheatstone bridges B1 and B2 having fixed resistors in two of their arms, and strain gauges S and SG, in their other respective arms. A balancing resistor R completes the circuit in order to allow the balancing of the "null" of each of the Wheatstone bridges. Strain gauges SG1 and SG2 respectively sense the lateral movement of the magnet 18 as is seen in FIG. 10. The magnet 18 moves, for instance, in the direction of the arrows, FIG. 11A, when the magnetic or ferromagnetic filament 20 is sensed not to be immediately beneath it e.g. one of the phantom locations of FIG. 11A. Hence, one of the gauges SG1 is stressed, while the other gauge SG2 is strained. Misbalancing of bridges B1 and B2 takes place and the respective voltages from each bridge B1 and B2 are fed to microprocessor MP-15 which thereafter controls hydraulic circuitry H and flow valves FV of FIG. 12. The mechanical steering is adjusted so the magnet 18 follows over the filament 20.

Referring now to FIG. 12, and the hydraulic components, H, of that figure, there is one forward, reverse and transfer flow valve FV1 which controls, in response to the commands provided by the microprocessor MP-15, hydraulic fluid flows from reservoir 75 via pump P. This valve FV is shown, in FIG. 12 in the neutral and non-communicating positions.

The upper portion of FIG. 12H illustrates a hydraulic cylinder 60 that controls steering. Typically, therefore, the hydraulic cylinder 60 is communicated to, on opposite sides of its movable piston 61 with flow control branches each consisting of a free flow valve, 50, only in one direction, and a metering valve 51, parallel therewith. When the flow valve FV is caused to be moved laterally, either left or right, in response to the command from the microprocessor MP-15, cylinder 60 will move, to extend or to contract in a responding manner its piston rod 60. Steering linkages (not shown) are connected to rod 62 and and stearing takes place. Referring to FIG. 9, electromagnetic device D corresponds to this.

Those skilled in the art will now appreciate that each of the single microprocessors MP-15 and MP-50 could be partitions within a single microprocessor and further that programming devices (not shown) could the associated with the microprocessor to command, at will, the vehicle around the factory floor.

Those skilled in the art will appreciate that various further embodiments of the invention may be made without deviating from the embodiments of the invention as claimed.

The embodiments of the invention in which an exclusive property or privilege is claimed are defined as follows:

1. A control module for controlling the travelling path of a moving vehicle, having a means for steering, into a selected one of a plurality of predetermined diverging paths, said system including:
   (a) a control module as aforesaid mounted near a diverging path;
   (b) a first metallic sensing means, carried by the vehicle, that is magnetically responsive to the location of a filament;
   (c) a second metallic sensing means carried by said vehicle that is magnetically responsive to a module;
   (d) a first position sensing means, affixed to the first metallic sensing means, for sensing relative lateral positioning of said first metallic means;
   (e) a second position sensing means responsive to said second metallic means; and,
   (f) first means responsive to said first and second position sensing means for moving said means for steering whereby to direct the travelling path of the vehicle along the path or course of the filament, and for steering the vehicle into and thence along one of said diverging paths when said second metallic and position sensing means are activated.

2. A system for controlling the travelling path of a moving vehicle, having a means for steering, into a selected one of a plurality of predetermined diverging paths, said system including:
   (a) a control module mounted near a diverging path that includes;
      (i) a plurality of predetermined spacially disposed magnetic actuating members; and,
      (ii) at least one non-magnetic actuating member disposed in said spacial relation;
   (b) a first sensing magnetic means, carried by the vehicle, that is magnetically responsive to the location of a filament;
   (c) a second magnetic sensing means carried by said vehicle that is magnetically responsive to a module;
   (d) a first position sensing means, affixed to the first magnet sensing means, for sensing relative lateral positioning of said first magnetic means;
   (e) a second position sensing means responsive to said second magnetic means; and,
   (f) first means responsive to said first and second position sensing means for moving said means for steering whereby to direct the travelling path of the vehicle along the path or course of the filament, and for steering the vehicle into and thence along one of said diverging paths when said second magnetic and position sensing means are activated.

3. A system for controlling the travelling path of a moving vehicle into a selected one of predetermined diverging paths, said system including:
   (a) a control module as claimed in claim 2, mounted near a diverging path;
   (b) a filament of metalic material positioned in juxtaposition with the travelling surface, so as to trace out sets of predetermined courses of travel;
   (c) a moving vehicle adapted to travel over the surface and having means for steering the same so as to follow a course of travel;
   (d) a first magnet means, carried by the vehicle, that is magnetically responsive to the location of the said filament;
   (e) a first position sensing means, affixed to the first magnet sensing means, for sensing relative lateral positioning of said first magnetic means;
   (f) a second position sensing means responsive to said second magnetic means; and,
   (g) first means responsive to said first and second position sensing means for moving said means for steering whereby to direct the travelling path of the vehicle along the path or course of the filament, and for steering the vehicle into and thence along one of said diverging paths when said second magnetic and position sensing means are activated.

4. A system for controlling the travelling path of a moving vehicle into a selected one of predetermined diverging paths, said system including:
   (a) a control module as claimed in claim 2, mounted near a diverging path;
   (b) a filament of metalic material positioned in juxtaposition with the travelling surface, so as to trace out sets of predetermined courses of travel;
   (c) a moving vehicle adapted to travel over the surface and having means for steering the same so as to follow a course of travel;
   (d) a first magnet means, carried by the vehicle, that is magnetically responsive to the location of the said filament;
   (e) a first position sensing means, affixed to the first magnet sensing means, for sensing relative lateral positioning of said first magnetic means;
   (f) a second position sensing means responsive to said second magnetic means;
   (g) first means responsive to said first and second position sensing means for moving said means for steering whereby to direct the travelling path of the vehicle along the path or course of the filament, and for steering the vehicle into and thence along one of said diverging paths when said second magnetic and position sensing means are activated; and,
   (h) and the filament of metalic material is a magnetic filament.

5. A system for controlling the travelling path of a moving vehicle into a selected one of predetermined diverging paths, said system including:
   (a) a control module as claimed in claim 2, mounted near a diverging path;
   (b) a filament of metalic material positioned in juxtaposition with the travelling surface, so as to trace out sets of predetermined courses of travel;
   (c) a moving vehicle adapted to travel over the surface and having means for steering the same so as to follow a course of travel;
   (d) a first magnet means, carried by the vehicle, that is magnetically responsive to the location of the said filament;
   (e) a first position sensing means, affixed to the first magnet sensing means, for sensing relative lateral positioning of said first magnetic means;
   (f) a second position sensing means responsive to said second magnetic means;

(g) first means responsive to said first and second position sensing means for moving said means for steering whereby to direct the travelling path of the vehicle along the path or course of the filament, and for steering the vehicle into and thence along one of said diverging paths when said second magnetic and position sensing means are activated.

(h) and the filament of metalic material is a magnetic filament; and, (i) wherein the first position sensing means includes at least one strain guage attached for stress in response to the relative position of the magnetic means, and electrically connected as one arm of a Wheatstone bridge, voltage means applied across a first pair of arms of said bridge, a pair of conductors connected across and opposite a second pair of said arms of said bridge, said pair of conductors communicating the voltage across said second pair of said arms to a microprocessor, programmed to respond to said voltage and means connecting the said microprocessor to a fluid control valve including forward, reverse and neutral hydraulic conduits, a source of hydraulic fluid flow communicating to the flow valve, and a pair of hydraulic conduits on opposite sides of the flow valve communicating to obverse sides of a movable piston with rod defined by a first hydraulic cylinder, whereby when the voltage across the second pair of said arms in the Wheatstone bridge has a polarity in one direction, the said rod is caused to move in a first direction and when the said voltage polarity is of opposite polarity the said rod moves in the direction opposite to said first direction, the rod attached to steering linkage of the prime mover to thereby control the path of travel of the vehicle along said filament.

6. A system for controlling the travelling path of a moving vehicle into a selected one of predetermined diverging paths, said system including:

(a) a control module as claimed in claim 2, mounted near a diverging path;

(b) a filament of metalic material positioned in juxtaposition with the travelling surface, so as to trace out sets of predetermined courses of travel;

(c) a moving vehicle adapted to travel over the surface and having means for steering the same so as to follow a course of travel;

(d) a first magnet means, carried by the vehicle, that is magnetically responsive to the location of the said filament;

(e) a first position sensing means, affixed to the first magnet sensing means, for sensing relative lateral positioning of said first magnetic means;

(f) a second position sensing means responsive to said second magnetic means;

(g) first means responsive to said first and second position sensing means for moving said means for steering whereby to direct the travelling path of the vehicle along the path or course of the filament, and for steering the vehicle into and thence along one of said diverging paths when said second magnetic and position sensing means are activated;

(h) and the filament of metalic material is a magnetic filament; and, (i) wherein the first position sensing means includes at least one strain guage attached for stress in response to the relative position of the magnetic means, and electrically connected as one arm of a Wheatstone bridge, voltage means applied across a first pair of arms of said bridge, a pair of conductors connected across and opposite a second pair of said arms of said bridge, said pair of conductors communicating the voltage across said second pair of said arms to a microprocessor, programmed to respond to said voltgage and means connecting the said microprocessor to a fluid control valve including forward, reverse and neutral hydraulic conduits, a source of hydraulic fluid flow communicating to the flow valve, and a pair of hydraulic conduits on opposite sides of the flow valve communicating to obverse sides of a movable piston with rod defined by a first hydraulic cylinder, whereby, when the voltage across the second pair of said arms in the Wheatstone bridge has a polarity in one direction, the said rod is caused to move in a first direction and when the said voltage polarity is of opposite polarity the said rod moves in the direction opposite to said first direction, the rod attached to steering linkage of the prime mover to thereby control the path of travel of the vehicle along said filament.

7. The system as claimed in claim 3 wherein the actuating rod is magnetic and the non-actuating rod is non-magnetic.

8. The system as claimed in claim 4 wherein the actuating rod is magnetic and the non-actuating rod is non-magnetic.

9. The system as claimed in claim 5 wherein the actuating rod is magnetic and the non-actuating rod is non-magnetic.

10. The system as claimed in claim 6 wherein the actuating rod is magnetic and the non-actuating rod is non-magnetic.

* * * * *